United States Patent [19]

Hvezda et al.

[11] Patent Number: 5,151,961
[45] Date of Patent: Sep. 29, 1992

[54] FERRULE ALIGNMENT ASSEMBLY FOR BLIND MATING OPTICAL FIBER CONNECTOR

[75] Inventors: Jaroslav M. Hvezda, Nepean; Robert W. Fisher, Ottawa; Edward J. Olszewski, Kanata; Hugh F. C. Morrin; Richard J. Glover, both of Ottawa, all of Canada

[73] Assignee: Northern Telecom Limited, Montreal, Canada

[21] Appl. No.: 838,170

[22] Filed: Feb. 20, 1992

[51] Int. Cl.$^5$ ............................. G02B 6/36; G02B 6/42
[52] U.S. Cl. ........................................ 385/60; 385/72; 385/78; 385/92
[58] Field of Search ............... 385/60, 70, 72, 78, 385/88, 90, 92; 439/55, 59, 61, 76, 246, 252, 577

[56] References Cited

U.S. PATENT DOCUMENTS

| | | | |
|---|---|---|---|
| 4,354,731 | 10/1982 | Mouissie | 385/60 |
| 4,541,685 | 9/1985 | Anderson | 350/96.20 |
| 4,690,494 | 9/1987 | Hirose et al. | 385/60 |
| 4,699,458 | 10/1987 | Ohtsuki et al. | 385/60 |
| 4,726,647 | 2/1988 | Kakii et al. | 385/60 |
| 4,895,425 | 1/1990 | Iwano | 350/96.20 |
| 4,923,272 | 5/1990 | Cuda | 350/96.20 |

OTHER PUBLICATIONS

"Circuit Board-to Backplane Connector for Fiber-to-the -Home Applications", FOC/LAN '88, 12th Int'l Fiber Optic Communications and Local Area Networks Exposition, Feb. 12-16, 1988, pp. 255-257.

"A High Fiber Density Optical Connector for use in Electronic Packaging Systems", SPIE vol. 752, Digital Optical Computing (1987), pp. 217-221.

Primary Examiner—Frank Gonzalez
Attorney, Agent, or Firm—C. W. Junkin

[57] ABSTRACT

An assembly for axially aligning two ferrules comprises a first housing, an alignment sleeve carrier, an alignment sleeve retained within a passage of the alignment sleeve carrier and a nut for securing the alignment sleeve carrier to the first housing such that a leading end of a first ferrule received in a passage of the first housing can extend into the alignment sleeve. The assembly further comprises a second housing, a socket member and a spring clip for securing the socket member to the second housing. The socket member has a through passage for receiving a second ferrule at one end and a leading end of the alignment sleeve carrier at another end such that the second ferrule can extend into the alignment sleeve for axial alignment with the first ferrule when the alignment sleeve carrier is received in the passage of the socket member. The spring clip permits limited movement of the socket member on the second housing to facilitate entry of the alignment sleeve carrier into the passage of the socket member and alignment of the first and second ferrules within the alignment sleeve. The assembly is used in a blind mating optical fiber connector.

20 Claims, 11 Drawing Sheets

FERRULE ALIGNMENT ASSEMBLY FOR BLIND MATING OPTICAL FIBER CONNECTOR

FIELD OF THE INVENTION

This invention relates geneally to ferrule lo alignment assemblies and more particularly to ferrule alignment assemblies used in blind mating optical fiber connectors.

BACKGROUND OF THE INVENTION

In one type of conventional optical fiber connector, optical fibers to be connected are secured within central bores of precision ferrules, and the ferrules are aligned within a ferrule alignment assembly.

A commonly used ferrule alignment assembly comprises a split alignment sleeve retained in a housing. The alignment sleeve has an inner diameter which is slightly less than an outer diameter of the ferrules to be aligned and an outer diameter which is slightly less than an inner diameter of the alignment sleeve carrier, so that the alignment sleeve expands radially on insertion of the ferrules into the alignment sleeve and exerts radially inward force to bring the ferrules into axial alignment.

The ferrules are mounted within ferrule carriers which include bayonet or threaded fittings for mating with complementary fittings on the housing to secure the ferrule carriers to the housing. The ferrules are mechanically coupled to the ferrule carriers by helical springs which permit limited axial and angular movement of the ferrules within the ferrule carriers so that the ferrules can be brought into butting alignment within the alignment sleeve when the ferrule carriers are secured to the housing.

Blind mating variants of conventional ferrule-type optical connectors have been developed for making optical connections between circuit cards and backplanes in equipment racks. The known blind mating connectors have one part which mounts to a rear edge of the circuit card and another part which mounts to the backplane, the two parts coming together to make an optical connection when the circuit card is inserted into an equipment rack to which the backplane is mounted. A first of the two parts includes an alignment sleeve carrier and an alignment sleeve into which a first axially sprung ferrule protrudes. A second of the two parts includes a socket into which the alignment sleeve carrier slides when the two parts come together, and a second axially sprung ferrule which protrudes into the socket. The second ferrule enters the alignment sleeve for alignment with the first ferrule when the alignment sleeve carrier enters the socket.

In the known blind mating ferrule-type optical connectors, the helical springs which mechanically couple the ferrules to the ferrule carriers must absorb tolerances in the location of the circuit card relative to the backplane, the location of the connector parts on the card and backplane, and the location of the ferrules within the connector parts. The accumulated tolerances can be large enough to require the mounting of one of the connector parts to another helical spring which absorbs tolerances which cannot be absorbed by the helical springs which couple the ferrules to the ferrule carriers. This requirement for three helical springs of appropriate relative stiffness complicates design and manufacture of such blind mating connectors.

Moreover, accumulated tolerances can lead to significant variation in the force with which the combined helical springs bias the ferrules together when the connector is mated. The variation in the biasing force can cause variations in optical loss.

In many applications of known blind mating ferrule-type optical connectors, the fiber terminated in the ferrule of the card-mounted part is coupled to an optoelectronic device mounted on the card. The optical fiber between the optoelectronic device and the ferrule must be long enough to absorb bending due to movement of the ferrule within the card-mounted part during mating of the connector parts without breaking and without introducing unacceptably high bending losses. Normally this requires storage of a loop of fiber on the card.

SUMMARY OF THE INVENTION

This invention provides novel ferrule alignment assemblies which are suitable for improved blind mating optical fiber connectors.

One aspect of the invention provides a novel ferrule alignment assembly comprising a first housing having a passage and a first ferrule rigidly mounted within the passage of the first housing. The assembly further comprises an alignment sleeve carrier having a passage extending therethrough, an alignment sleeve retained within the passage of the alignment sleeve carrier, and first securing means for securing the alignment sleeve carrier to the first housing with the passage of the alignment sleeve carrier aligned with the passage of the first housing and with a leading end of a first ferrule extending into the alignment sleeve retained in the passage of the alignment sleeve carrier. The first securing means permits limited movement of the alignment sleeve carrier relative to the first housing.

The novel ferrule alignment assembly further comprises a second housing, a socket member, and second securing means for securing the socket member to the second housing. The socket member has a passage extending therethrough for receiving a second ferrule at one end of the passage and a leading end of the alignment sleeve carrier at another end of the passage such that a leading end of the second ferrule can extend into the alignment sleeve for axial alignment with the first ferrule when the alignment sleeve carrier is received in the passage of the socket member. The second securing means permits limited movement of the socket member relative to the second housing.

In the novel ferrule alignment assembly, the limited movement of the alignment sleeve carrier relative to first housing and of the socket member relative t the second housing are such as to facilitate entry of the alignment sleeve carrier into the passage of the socket member and alignment of the first and second ferrules in the alignment sleeve.

Preferably, the first securing means permits limited lateral, axial and angular movement of the alignment sleeve carrier relative to the first housing, and the second securing means permits limited lateral, axial and angular movement of the socket member relative to the second housing.

The rigid mounting of the first ferrule to the first housing permits rigid mounting of an optoelectronic device to that housing and coupling of that optoelectronic device directly to a fiber stub secured in the rigidly mounted ferrule. Because the fiber stub carrying ferrule and the optoelectronic device are both rigidly mounted with respect to each other, no intervening loop of fiber is needed to prevent fiber breakage and control bending losses, and no means for storage of the fiber loop need be provided on the card as is required for known blind mating ferrule-type optical connectors.

Another aspect of the invention provides a novel ferrule alignment assembly comprising a first housing having a passage for receiving a first ferrule, an alignment sleeve carrier, an alignment sleeve, and first securing means for securing the alignment sleeve carrier to the first housing. The alignment sleeve carrier has a passage extending therethrough within which the alignment sleeve is retained. The alignment sleeve carrier also has ramp surfaces adjacent to a leading end of the alignment sleeve carrier, and laterally extending grooves adjacent to the ramp surfaces. The first securing means secures the alignment sleeve carrier to the first housing with the passage of the alignment sleeve carrier aligned with the passage of the first housing such that a leading end of a first ferrule received in the passage of the first housing can extend into the alignment sleeve retained in the passage of the alignment sleeve carrier.

The novel ferrule alignment sleeve assembly further comprises a second housing, a socket member and second securing means for securing the socket member to the second housing. The socket member has a passage extending therethrough for receiving a second ferrule at one end of the passage and the leading end of the alignment sleeve carrier at another end of the passage such that a leading end of the second ferrule can extend into the alignment sleeve for axial alignment with the first ferrule received in the passage of the first housing when the alignment sleeve carrier is received in the passage of the socket member. The socket member has a pair of laterally extending slots on opposite sides of the socket member. The slots extend through the sides of the socket member to the passage of the socket member. The second securing means comprise spring means having a pair of spring elements which fit into the slots of the socket member to capture the socket member on the second housing while permitting limited movement of the socket member relative to the second housing. The spring elements protrude laterally into the passage of the socket member from the slots.

Insertion of the alignment sleeve carrier into the socket member causes the spring elements to ride up over the ramp surfaces of the alignment sleeve carrier and drop into the grooves of the alignment sleeve carrier, thereby latching the alignment sleeve carrier into the socket member. The limited movement of the socket member relative to the second housing facilitates entry of the alignment sleeve carrier into the passage of the socket member and alignment of the first and second ferrules within the alignment sleeve.

Preferably, the spring means is mounted for limited axial movement relative to the second housing between a forward limit and a rearward limit, and insertion of the alignment sleeve carrier into the socket member forces the spring means to its rearward limit of axial movement on the second housing while the spring elements ride up over the ramp surfaces of the alignment sleeve carrier, but permits the spring means to move forward of the rearward limit when the spring elements drop into the grooves of the alignment sleeve carrier. The spring means and the grooves of the alignment sleeve carrier then together define a reference plane which is independent of the location of the circuit card relative to the backplane and independent of the location of the connector parts on the card and backplane.

Consequently, helical springs coupling the ferrules to the housings need only absorb tolerances due to the location of the ferrules within the connector parts, and these tolerances can be made small enough that only one ferrule need be provided with a helical spring, the other ferrule being rigidly mounted to its housing.

BRIEF DESCRIPTION OF ACCOMPANYING DRAWINGS

Embodiments of the invention are described below by way of example only. Reference is made to accompanying drawings, in which:

FIG. 3a is a cross-sectional view of the card-edge part of FIG. 2a;

DETAILED DESCRIPTION OF EMBODIMENTS

Figure 1:
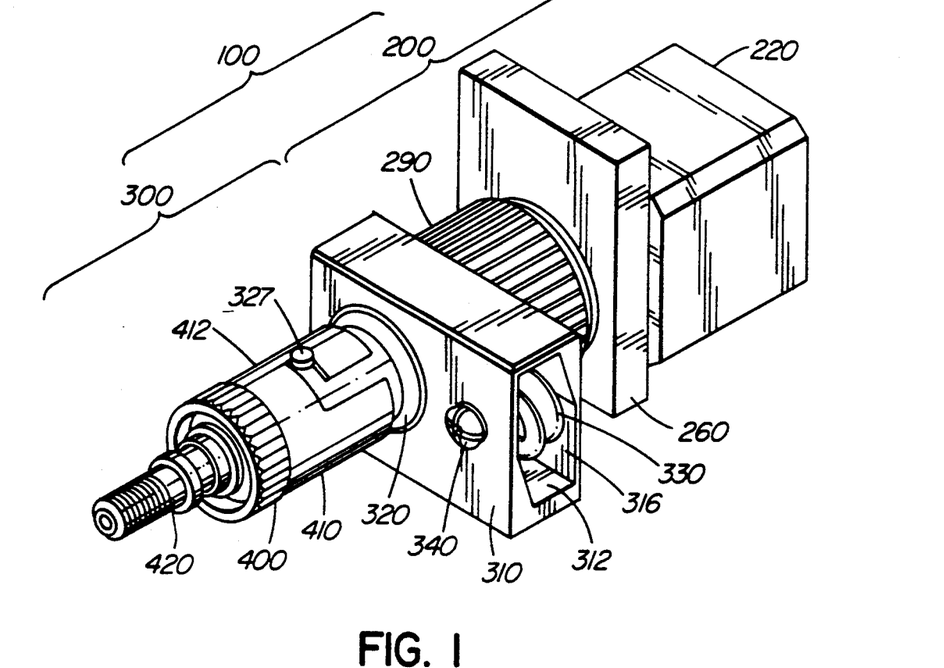
FIG. 1 is a perspective view of an alignment assembly according to an embodiment of the invention.
Figure 2A:
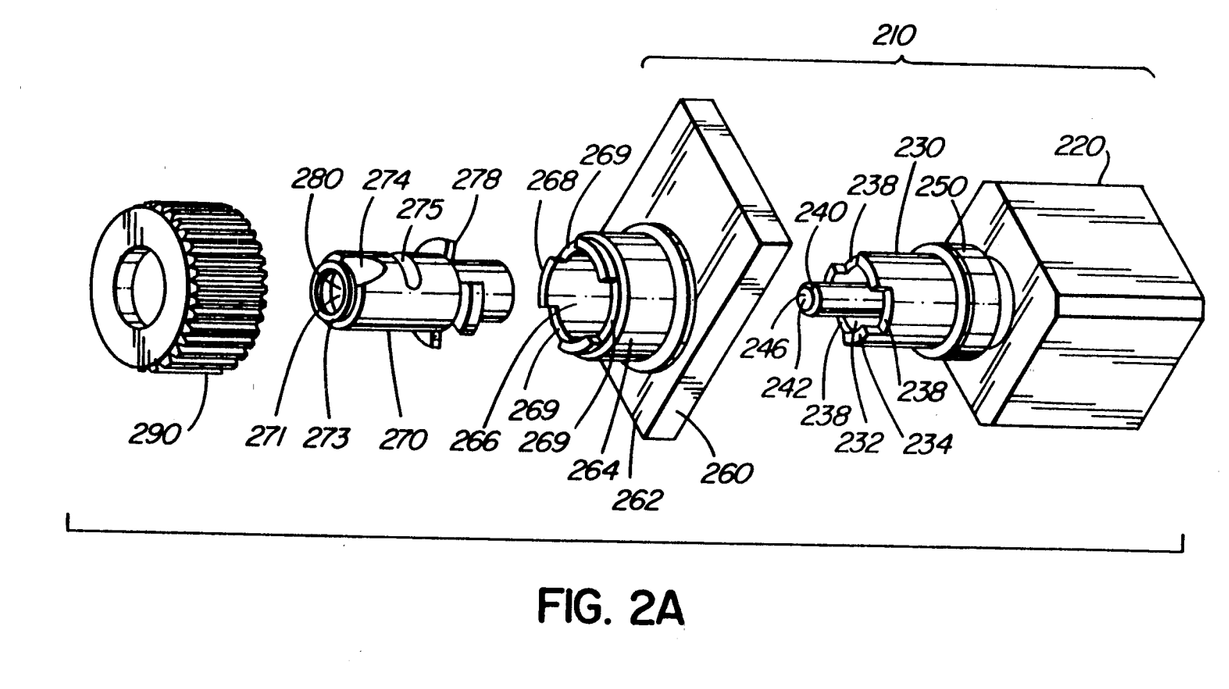
FIG. 2a is an exploded perspective view of a card-edge part of the alignment assembly shown in FIG. 1.
Figure 2B:
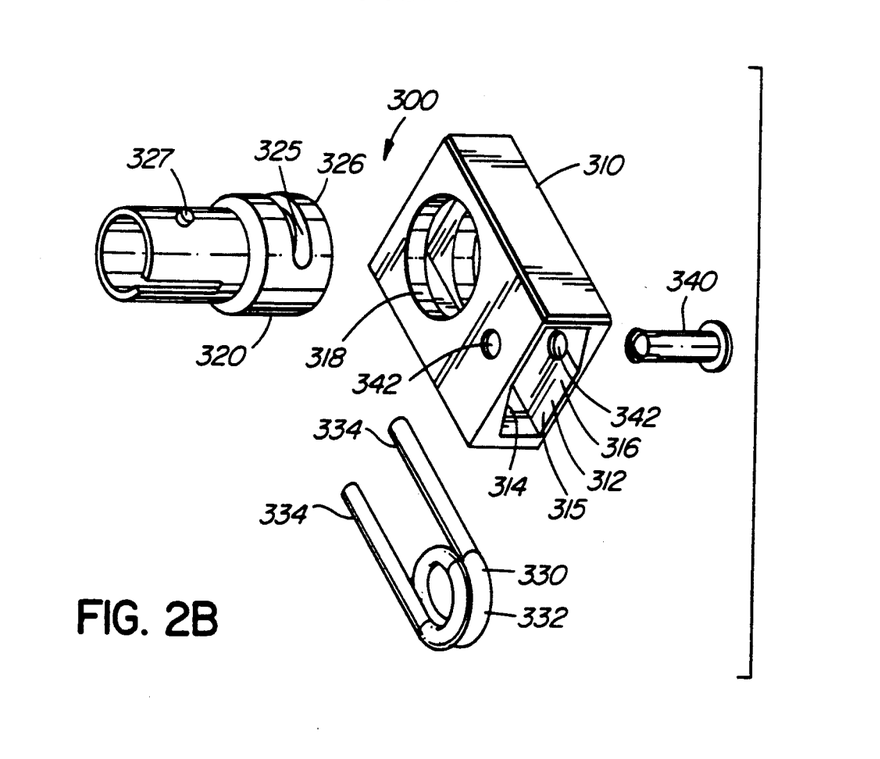
FIG. 2b is an exploded perspective view of a backplane part of the alignment assembly shown in FIG. 1.
Figure 3A:
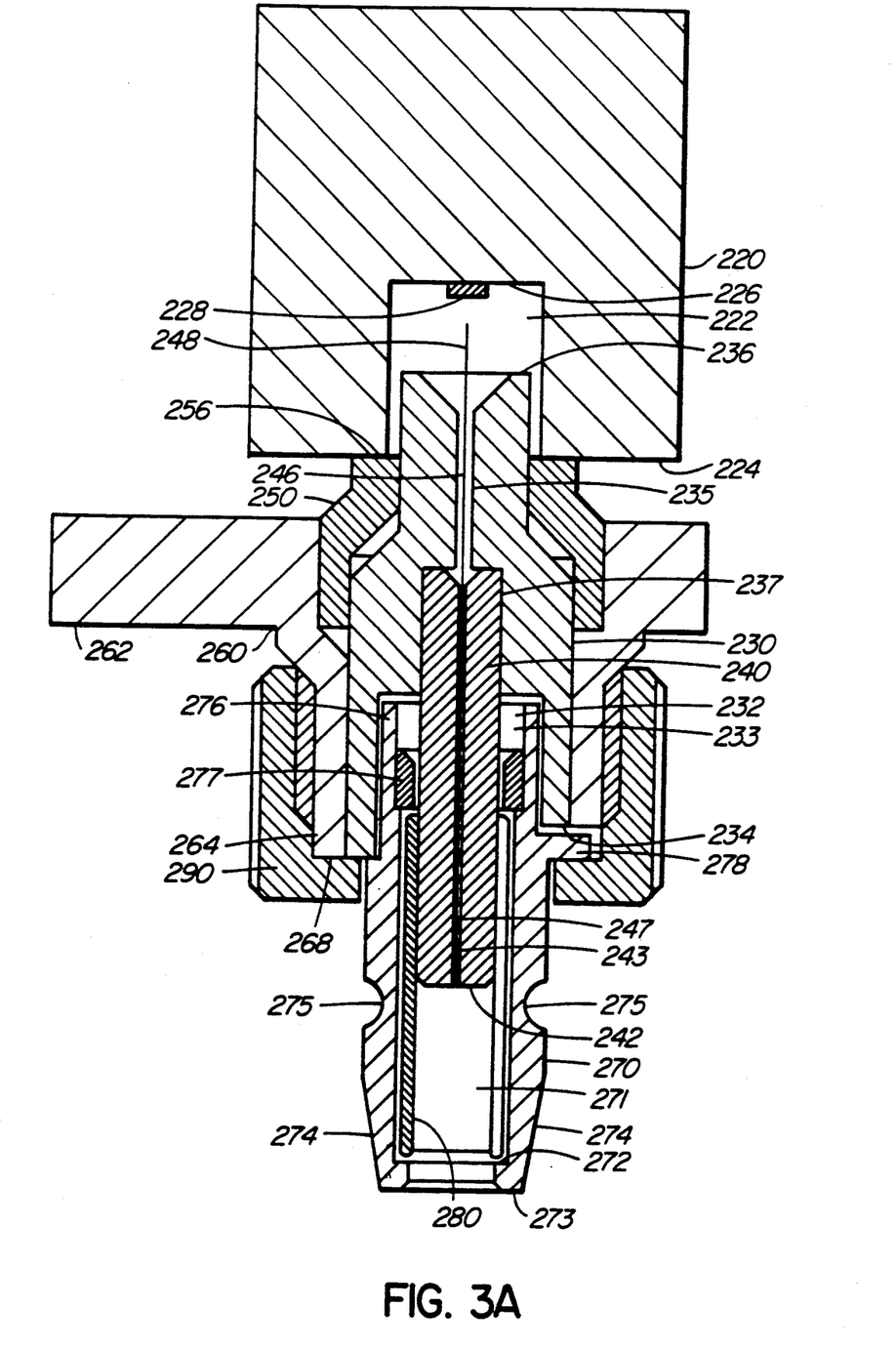
Figure 3B:
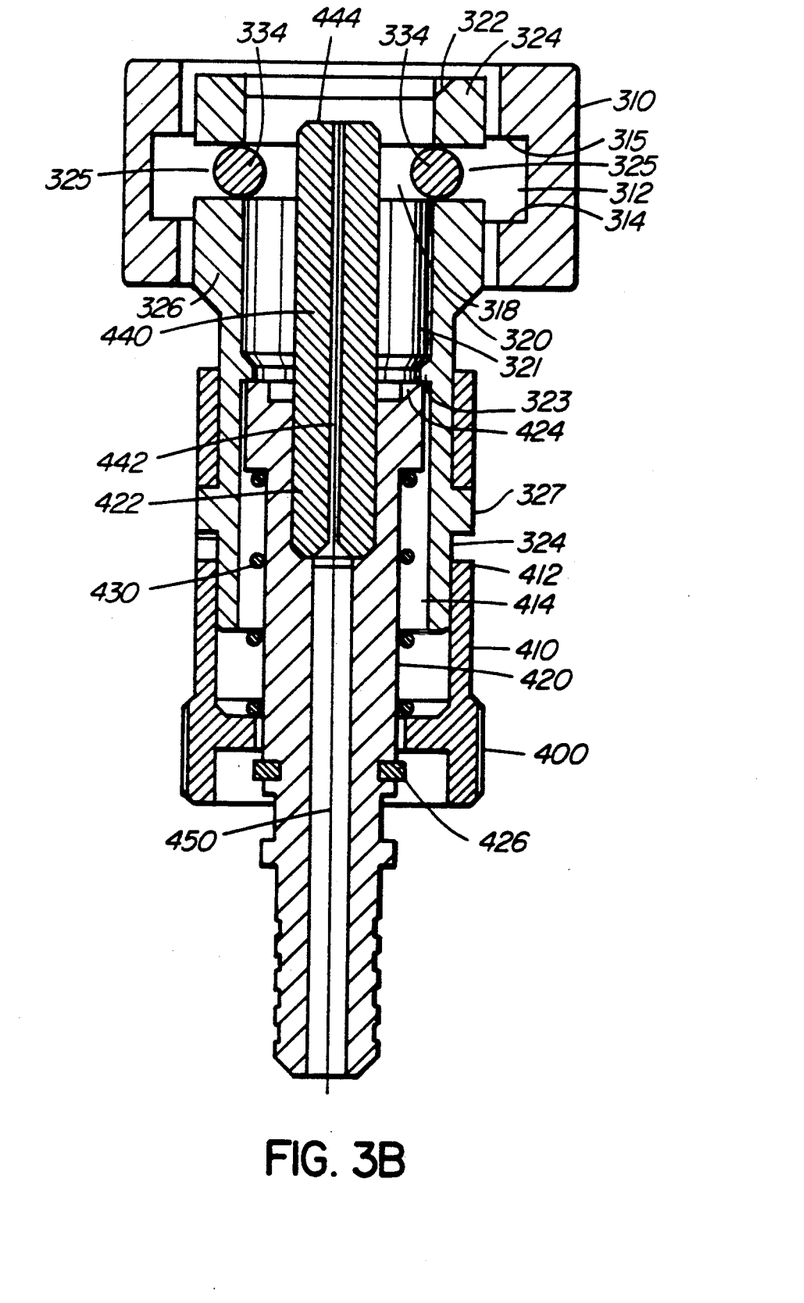
FIG. 3b is a cross-sectional view of the backplane part of FIG. 2b.

FIG. 1 is a perspective view of an assembly 100 for axially aligning two ferrules. The assembly 100 comprises a card-edge part 200 and a backplane part 300. FIG. 2a is an exploded perspective view and FIG. 3a is a cross-sectional view of the card-edge part 200. FIG. 2b is an exploded perspective view and FIG. 3b is a cross-sectional view of the backplane part 300.

The card-edge part 200 comprises a first housing 210 for mounting to a rear edge of a circuit card or circuit module. The first housing 210 comprises a mounting block 220 having a recess 222 in an end surface 224. The recess 222 is terminated in a device mounting surface 226 to which an optoelectronic device 228 is mounted.

The first housing 210 further comprises a ferrule retainer 230 having a central passage 232. The passage 232 has a wide portion 233 adjacent an outer end 234 of the ferrule retainer 230, a narrow portion 235 adjacent an inner end 236 of the ferrule retainer 230 and a central portion 237 of intermediate width between the wide and narrow portions 233, 235. The ferrule retainer 230 also has three radially extending notches 238 at its outer end 234.

A first precision ferrule 240 is received in the central portion 237 of the passage 232 and rigidly retained with a suitable adhesive such as epoxy. The ferrule 240 has a leading end 242 which protrudes from the outer end 234 of the ferrule retainer 230 and a central passage 243 which receives and retains an optical fiber stub 246. The optical fiber stub 246 has an outer end 247 which is secured in the passage 243 and polished flush with the leading end 242 of the ferrule 240, and an inner end 248 which protrudes from the ferrule 240 along the narrow portion 235 of the ferrule retainer 230.

The first housing 210 further comprises an alignment tube 250. The ferrule retainer 230 is inserted into the alignment tube 250 with the inner end 236 of the ferrule retainer 230 protruding beyond an inner end surface 256 of the alignment tube 250, and the protruding end 236 of the ferrule retainer 230 is inserted into the recess 222 until the inner end surface 256 of the alignment tube 250 bears against the end surface 224 of the mounting block 220. The inner end surface 256 of the alignment tube 250 is then moved laterally on the end surface 224 of the mounting block 220 and the ferrule retainer 230 is moved axially within the alignment tube 250 to optimize optical coupling between the optoelectronic device 228 and the fiber stub 246. The alignment tube 250 is secured in its optimal position on the end surface 224 of the mounting block 220 and the ferrule retainer 230 is secured in its optimal position in the alignment tube 250 by laser welding.

The card-edge part 200 further comprises a bracket 260 comprising a bracket body 262 having a screw-threaded tubular projection 264. A passage 266 extends through the body 262 and projection 264, and an outer end 268 of the projection 264 has three radially extending notches 269. The ferrule retainer 230 fits into the passage 266 of the bracket 260 with the outer end 234 of the ferrule retainer 230 flush with the outer end 268 of the projection 264 and the radial notches 238 of the ferrule retainer 230 radially aligned with the radial notches 269 of the projection 264. The bracket 260 is mounted to the rear edge of the circuit card or module with the ferrule retainer 230 in place.

The card-edge part 200 further comprises an alignment sleeve carrier 270 having a passage 271 which extends axially through the alignment sleeve carrier 270. The passage 271 has an internal annular shoulder 272 at a leading end 273 of the alignment sleeve carrier 270. The leading end 273 of the alignment sleeve carrier 270 is champfered and has a pair of ramp surfaces 274 and a pair of laterally extending grooves 275, each groove 275 adjacent a respective one of the ramp surfaces 274.

The card-edge part 200 further comprises a split alignment sleeve 280 having an inner diameter which is slightly less than the outer diameter of the ferrule 240 and an outer diameter which is slightly less than the inner diameter of the alignment sleeve carrier 270. The alignment sleeve 280 is inserted into the passage 271 from a trailing end 276 of the alignment sleeve carrier 270, and a retaining ring 277 of the alignment sleeve carrier 270 is friction fit into the passage 271 to define another shoulder which, together with the shoulder 272, retains the alignment sleeve 280 in the passage 271.

The leading end 242 of the first ferrule 240 is inserted into the passage 271 at the trailing end 276 of the alignment sleeve carrier 270 where it picks up and enters the alignment sleeve 280, the alignment sleeve 280 expanding resiliently and radially to receive the ferrule 240.

The alignment sleeve carrier 270 also has a radially notched outer flange 278 spaced from the trailing end 276 to define an external shoulder. The trailing end 276 of the alignment sleeve carrier 270 fits loosely into the wide portion 233 of the passage 232 of the ferrule retainer 230, and the flange 278 bears against the outer ends 234, 268 of the ferrule retainer 230 and the tubular projection 264 of the bracket 260. The notched flange 278 of the alignment sleeve carrier 270 mates with the complementary notches 238, 269 of the ferrule retainer 230 and the projection 264 of the bracket 260 to rotationally key the alignment sleeve carrier 270 to the first housing 210.

The card-edge part 200 further comprises first securing means in the form of a retaining nut 290 which threads onto the complementary screw threaded tubular projection 264 of the bracket 260 to secure the alignment sleeve carrier 270 to the first housing 210. The nut 290 bears against the outer end collar 268 of the tubular projection 264 when the nut 290 is fully tightened onto the tubular projection 264 and captures the flange 278 of the alignment sleeve carrier 270 to retain the alignment sleeve carrier 270 on the first housing 210. The radial notches 238, 269 of the ferrule retainer 230 and the tubular projection 264 are deeper than the thickness of the flange 278 and the trailing end 276 of the alignment sleeve carrier 270 fits loosely in the wide portion 233 of the passage 232 of the ferrule retainer 230 so that the nut 280 permits limited lateral, axial and angular movement of the alignment sleeve carrier 270 on the first housing 210.

The backplane part 300 comprises a second housing 310 having a cavity 312 defined by a pair of axially spaced walls 314, 315. The cavity 312 has a lateral opening 316. A passage 318 extends axially through the second housing 310 passing through each of the walls 314, 315.

The backplane part 300 further comprises a socket member 320 having a through passage 321. The passage 321 is internally champfered at a leading end 322 and has an internal shoulder 323 between its leading end 322 and a trailing end 324. The socket member 320 has a pair of laterally extending slots 325 which extend through opposite sides 326 of the socket member 320 to the passage 321 adjacent its leading end 322. The socket member 320 also has a male bayonet fitting 327 adjacent its trailing end 324. The socket member 320 fits loosely into the passage 318 of the second housing 310.

The backplane part 300 further comprises second securing means comprising spring means in the form of a spring clip 330. The spring clip 330 comprises a spring member having a coiled central portion 332 and ends protruding from the coiled portion 332 to define a pair of spring elements or legs 334. The socket member 320 is inserted into the passage 318 of the second housing 310 and the spring clip 330 is inserted into the lateral opening 316 of the second housing 310 so that the legs 334 fit into the slots 325 to capture the socket member 320 in the passage 318 of the second housing 310. The legs 334 protrude laterally into the passage 321 of the socket member 320 from the slots 325.

The backplane part 300 further comprises a spring clip retainer in the form of a pin 340 which is friction fit into aligned holes 342 in the axially spaced walls 314, 315 to extend axially between the walls 314, 315 and to pass through the coiled portion 332 capturing the spring clip 330 between the axially spaced walls 314, 315. The pin 340 permits limited axial, angular and lateral movement of the spring clip 330 within the cavity 312, thereby permitting limited axial, angular and lateral movement of the socket member 320 within the passage 318 of the second housing 310. The axially spaced walls 314, 315 define forward and rearward limits respectively of the axial movement of the spring clip 330 within the cavity 312.

In FIGS. 1 and 3b, a ferrule carrier 400 is shown mounted to the backplane part 300. The ferrule carrier 400 comprises a barrel 410 having a female bayonet fitting 412 and a through passage 414. A backshell 420 slides within the passage 414 and is mechanically coupled to the barrel 410 by a helical spring 430. The backshell 420 is retained within the passage by a C-clip 426.

The backshell 420 has a through passage 422 within which a second precision ferrule 440 is secured. Like the first ferrule 240, the second ferrule 440 has a central passage 442 within which an optical fiber 450 is secured. The optical fiber 450 is polished flush with a leading end 44 of the ferrule 440.

The ferrule carrier 400 is mounted to the backplane part 300 by inserting the ferrule 440 into the passage 321 of the socket member 320 at the trailing end 24 of the passage 321, and mating the female bayonet fitting 412 of the barrel 410 with the male bayonet fitting 27 of the socket member 320. During the mating operation, a leading end 424 of the backshell 420 bears against the internal shoulder 323 of the socket member 320, and the spring 430 compresses to permit the second ferrule 440 to protrude beyond the barrel 410 into the passage 321 of the socket member 320.

Figure 4:
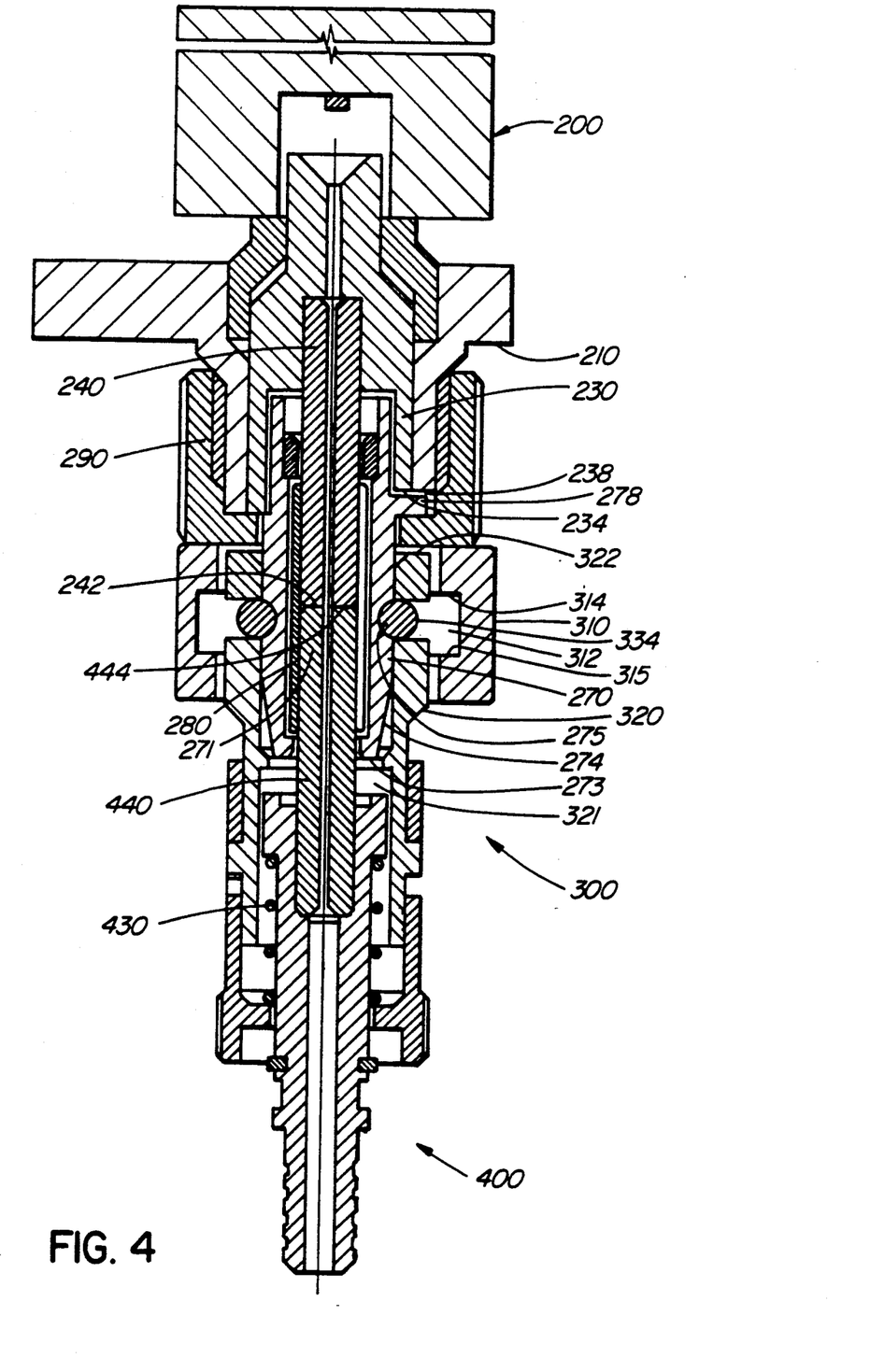
FIG. 4 is a cross-sectional view of the alignment assembly parts shown in FIGS. 3a and 3b when mated.

FIG. 4 is a cross-sectional view of the card-edge part 200 and the backplane part 300 when mated. The card-edge part 200 is mounted at a rear edge of a circuit card or module and the backplane part 300 is mounted to a backplane of an equipment rack so that alignment sleeve carrier 270 of the card-edge part 200 enters the socket member 320 of the backplane part 300 as the circuit card is fully inserted into card guides of the equipment rack. The champfered ends 273, 322 of the alignment sleeve carrier 270 and the passage 321 of the socket member 320 facilitate entry of the alignment sleeve carrier 270 into the socket member 320 when the card-edge part 200 and backplane part 300 are slightly misaligned. Moreover, the alignment sleeve carrier 270 is capable of limited angular and lateral movement on the first housing 210 and the socket member 320 is capable of limited angular and lateral movement on the second housing 310 to facilitate entry of the alignment sleeve carrier 270 into the socket member 320.

Upon entry of the alignment sleeve carrier 270 into the socket member 320, the ramp surfaces 274 engage the legs 334 of the spring clip 330 and urge the spring clip 330 and socket member 320 rearward in the cavity 312 until the spring clip 330 engages the rearmost wall 315 at its rearward limit of axial movement. (The rotational keying of the alignment sleeve carrier 270 to the ferrule retainer 230 by means of the notches 238 and flange 278 prevents rotation of the alignment sleeve carrier 270 when it is secured to the first housing 210 to ensure proper engagement of the ramp surfaces 274 with the spring clip legs 334.) At the same time, the flange 278 of the alignment sleeve carrier 270 is urged rearward against the outer end 234 of the ferrule retainer 230. Further insertion of the alignment sleeve carrier 270 into the socket member 320 causes the legs 334 of the spring clip 330 to ride up over the ramp surfaces 274 and drop into the grooves 275, thereby latohinq the aliqnment sleeve oarrier 270 into the socket member 320.

Also during entry of the alignment sleeve carrier 270 into the socket member 320, the leading end 444 of the second ferrule 440 enters the passage 271 of the alignment sleeve carrier 270 and picks up the leading end of the alignment sleeve 280. When the leading end 444 of the second ferrule 440 engages the leading end 242 of the first ferrule 240, the helical spring 430 compresses to permit the alignment sleeve carrier 270 to enter the socket member 320 far enough for latching as described above. The alignment sleeve 280 expands resiliently and radially to permit entry of the second ferrule 440 and exerts a radially inward force to hold the first and second ferrules 240, 440 in axial alignment. The helical spring 430 keeps the second ferrule 440 butted against the first ferrule 240. Limited angular and axial movement of the alignment sleeve carrier 270 on the first housing 210 and of the socket member 320 on the second housing 310 facilitates alignment of the ferrules 240, 440 in the alignment sleeve 280.

When the legs 334 of the spring clip 330 drop into the grooves 275 of the alignment sleeve carrier 270 to latch the alignment sleeve carrier 270 into the socket member 320, they pull the alignment sleeve carrier 270 forward, disengaging the flange 278 from the outer end 234 of the ferrule retainer 230. The minimum distance between the rearmost wall 315 of the cavity 312 and the outer end 234 of the ferrule retainer 230 when the card-edge part 200 is mated to the backplane part 300 is made less than the distance between the flange 278 and the grooves 275 of the alignment sleeve carrier 270 so that the spring clip 330 can move away from the rearmost wall 315 of the cavity 312 (i.e. forward of its rearward limit of axial movement) when the alignment sleeve carrier 270 is latched into the socket member 320. This permits the alignment sleeve carrier 270 and socket member 320 to move within their limited range of angular, axial and lateral movement to a position in which residual stresses, such as side loads, are minimized and balanced. A small clearance is provided between the socket member 320 and the retaining nut 290 when the spring clip legs 334 are in the alignment sleeve carrier grooves 275 to ensure that the socket member 320 and the alignment sleeve carrier 270 are free to move within their range of angular, axial and lateral movement to minimize residual stresses.

The card-edge part 200 can be unmated from the backplane part 300 by pulling the card-edge part with sufficient force to disengage the legs 334 of the spring clip 330 from the grooves 275 of the alignment sleeve carrier 270. The depth of the grooves 275 is made less than radius of the circular cross-section of the legs 334 to ensure that the legs 334 will disengage from the grooves 275 when pulled with sufficient force.

Figure 5:
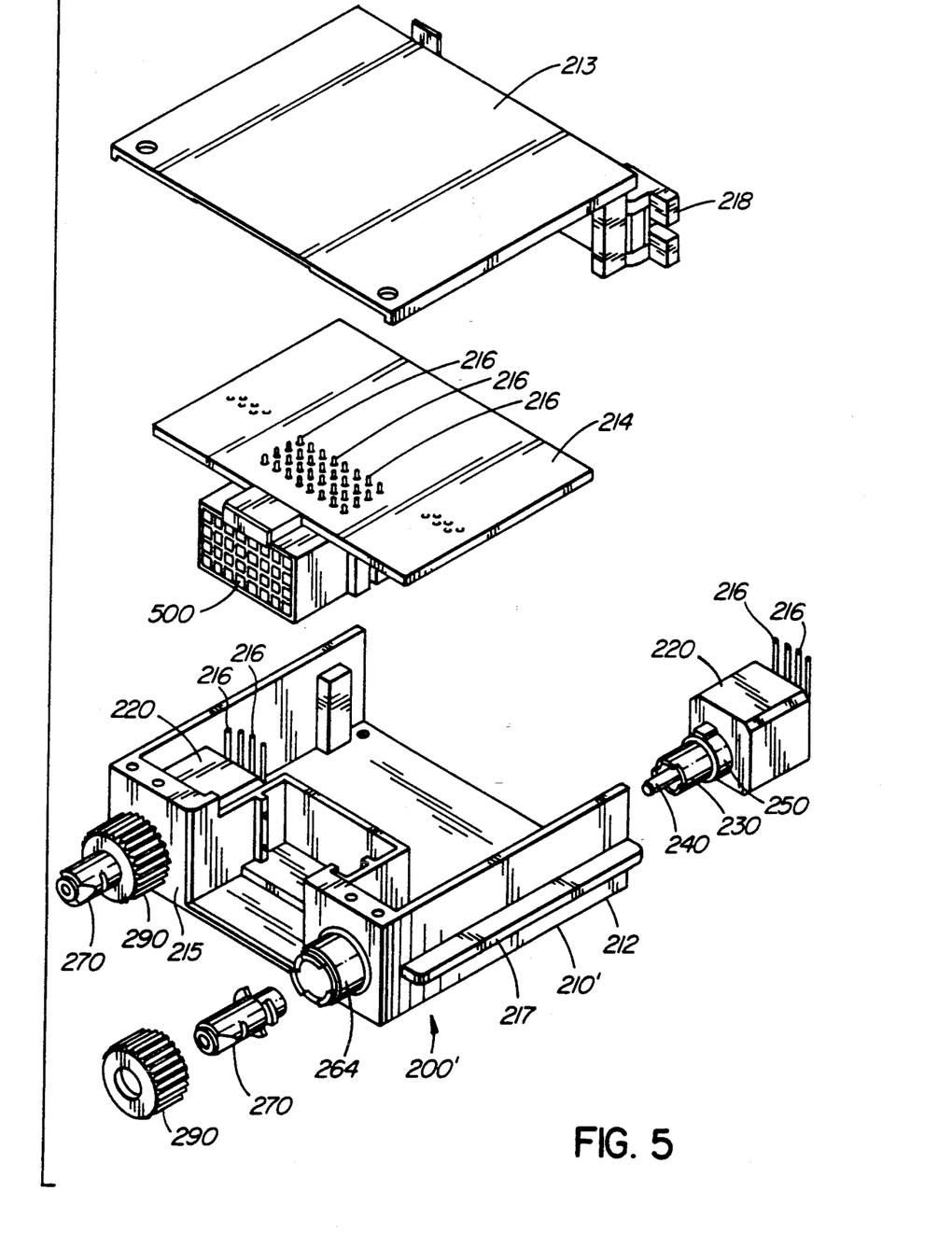
FIG. 5 is an exploded perspective view of an optical module incorporating the card-edge part of the alignment assembly of FIG. 1.
Figure 6A:
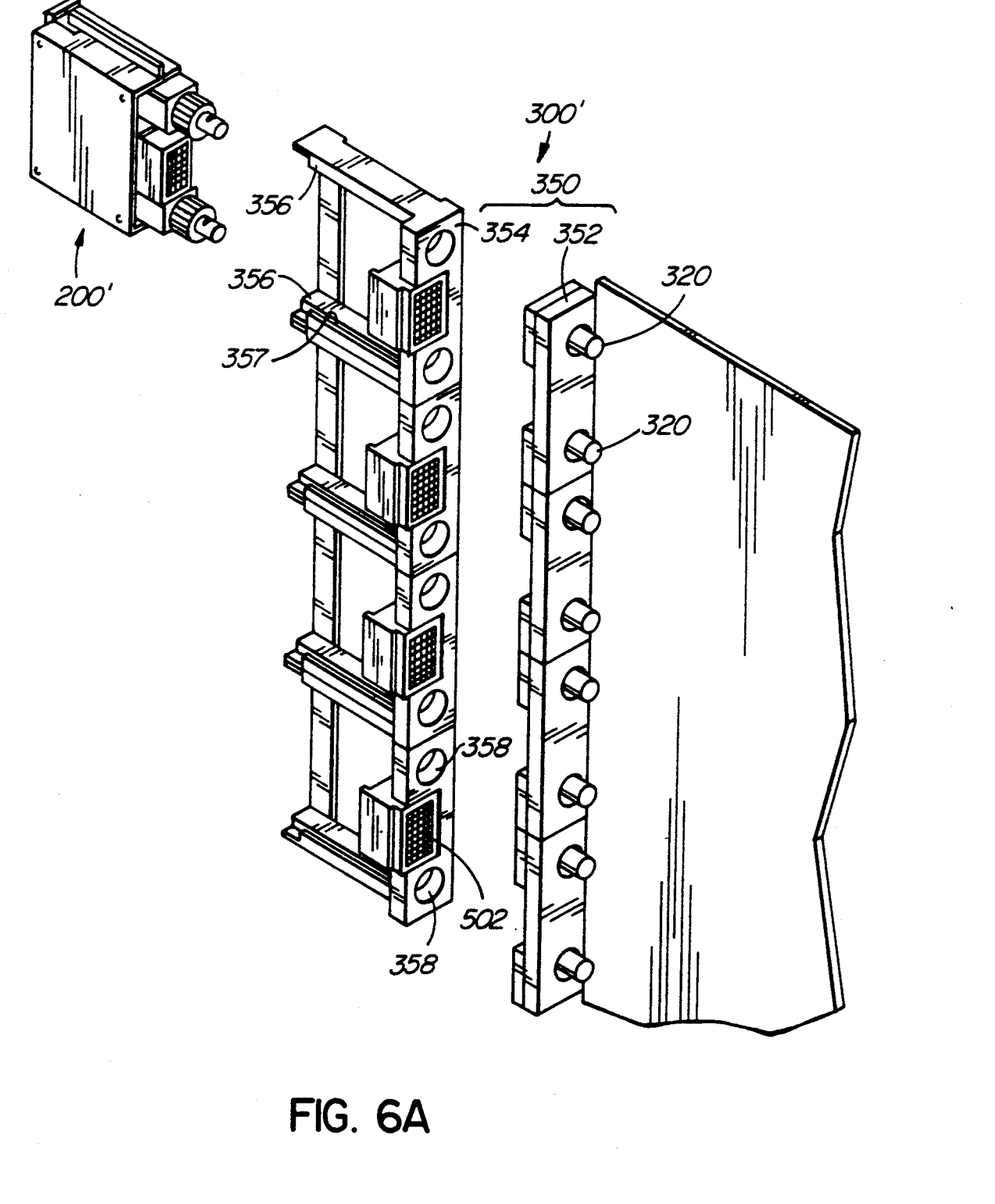
FIG. 6a is a perspective view of the optical module of FIG. 5 with associated backplane parts.
Figure 6B:
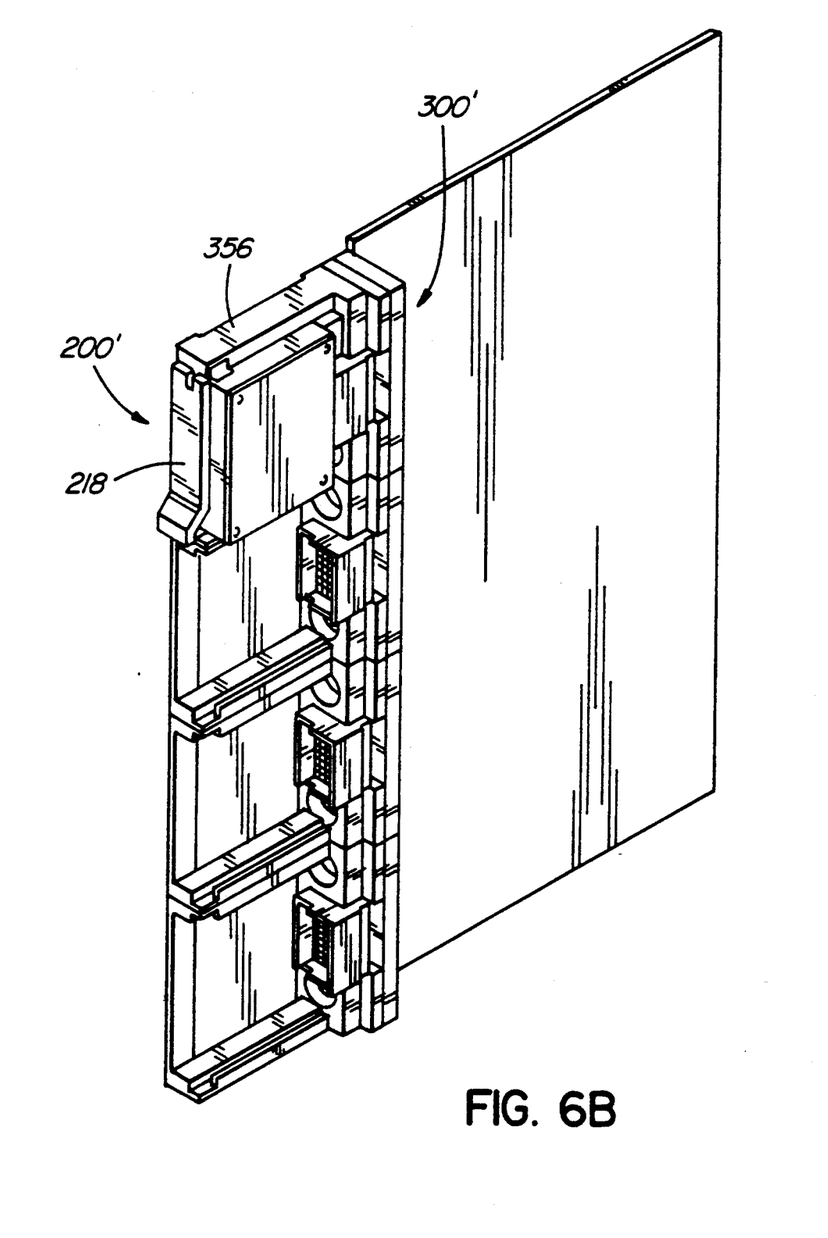
FIG. 6b is a perspective view of the optical module and backplane parts of FIGS. 6a shown mated.

FIG. 5 is an exploded perspective view of a card-edge part 200' having a first housing 210, adapted to carry two optoelectronic devices 228 and associated electronic circuitry. FIG. 6a is a perspective view of the cardedge part 200, with associated backplane parts 300', and FIG. 6b is a perspective view of the card-edge part 200' and backplane parts when mated.

In the card-edge part 200', the first housing 210' further comprises a module carrier comprising a base 212 and a lid 213 which fastens to the base 212 to enclose a printed circuit board 214. The base 212 carries two mounting blocks 220 at a leading edge 215. Two alignment sleeve carriers 270 are secured to the base 212, each via a respective one of the mounting blocks 220. Each alignment sleeve carrier 270 is mounted for limited axial, angular and lateral movement via retaining nut 290 and a threaded tubular projection 264 as in the alignment assembly 100. An electrical card-edge connector part 500 is also mounted on the base 212, and the electrical card-edge connector part 500 and optoelectronic devices 228 carried by the mounting blocks 220 are electrically connected to the circuit board 214 by terminal pins 216. The base 212 further comprises two guide formations in the form of axially extending ridges 217 at side edges of the base 212. The lid 213 also includes a latch release in the form of a lever 218 pivotably mounted at a rear edge of the carrier 212.

The second housing 310' of the associated backplane parts further comprises a two part frame 350. Two socket members 320 are secured to a rearward part 352 of the frame 350, each mounted for limited axial, angular and lateral movement as in the alignment assembly 100. A forward part 354 of the frame 350 carries an electrical card-edge connector part 502 which is complementary to the electrical card-edge connector part 500 on the first housing 210'. The forward part 354 of the frame 350 comprises two guide formations in the form of guide rails 356 extending axially along the forward part 354, each quide rail 356 havinq a qroove 357 whioh is oomplementary to a respective one of the ridqes 217 ot the tirst housinq 210'. The forward part 354 also has two openings 358. The forward part 354 is secured to the rearward part 352 with the openings 358 aligned with the socket members 320.

The connector parts 200', 300' are mated by sliding the ridges 217 along the complementary grooves 357 of the guide rails 356. The ridges 217 and guide rails 356 guide the housings 210', 310' together so that the alignment sleeve carriers 270 enter respective socket members 320 through the openings 358 to align two pairs of first and second ferrules 240, 440 in a single mating operation, and the electrical card edge connector parts 500, 502 mate to complete an electrical connection in the same mating Operation.

FIB. 6b shows the connector 200', 300', when mated. The connector parts 2---', 400', can be unlatched by pivoting one end of the lever 218 away from the rear edge of the tirst housinq 210' to urge the other end of the lever 218 against a forward end of one of the guide rails 356 and thereby pull the first housing 210' and its attached alignment sleeve carriers 270 away from the frame 350 and its attached socket members 320.

Figure 7:
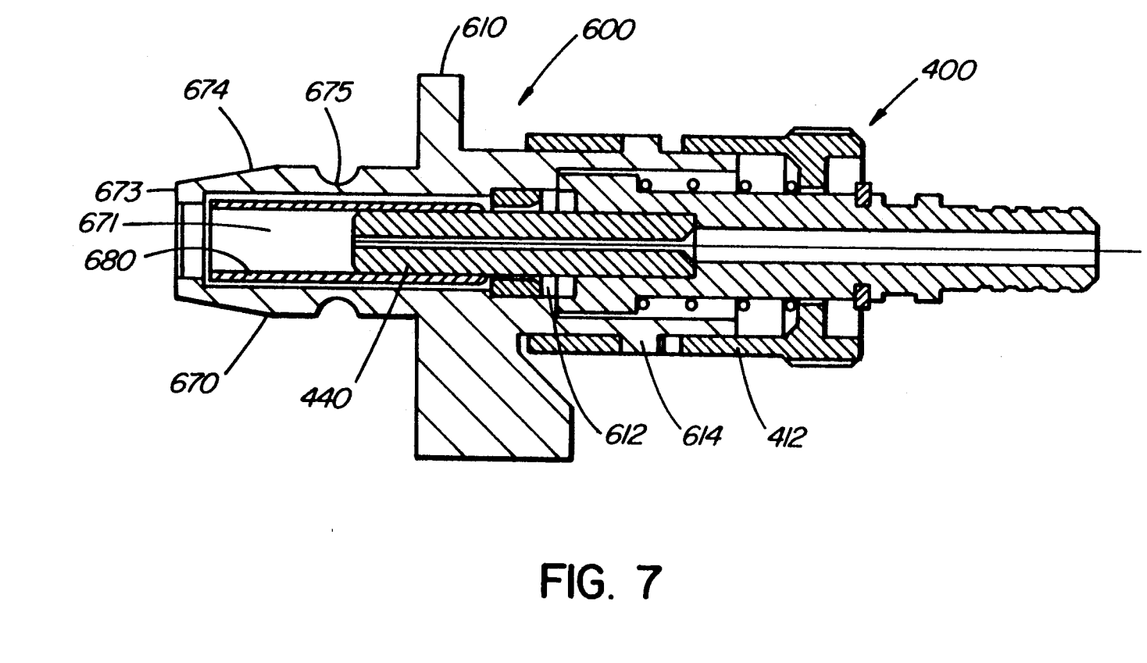
FIG. 7 is a cross-sectional view of a crd-edge part of an alignment assembly according to another embodiment of the invention.

FIG. 7 is a cross-sectional view of a card-edge part 600 of another ferrule alignment assembly. The card-edge part 600 is adapted to receive a ferrule 440 of a ferrule carrier 400 as described above.

The card-edge part 600 comprises a first housing 610 which has a through passage 612 for receiving the ferrule 440 of the ferrule carrier 400. The first housing 610 further comprises a male bayonet fitting 614 for mating with a female bayonet fitting 412 of the ferrule carrier 400 to secure the ferrule carrier 400 to the first housing 610 with the ferrule 440 extending into the passage 612.

The card-edge part 600 further comprises an alignment sleeve carrier 670 which is integral with the first housing 610. An alignment sleeve 680 is retained in a through passage 671 of the alignment sleeve carrier 670 in the manner described above for the alignment sleeve carrier 270 and alignment sleeve 280 of the ferrule alignment assembly 100. The alignment sleeve carrier 670 has a champfered leading end 673 bearing ramp surfaces 674 and grooves 675 similar to the corresponding structures 273, 274, 275 of the alignment sleeve carrier 270.

In use, ferrule carriers 400 are mated with the card-edge part 600 and a backplane part 300 as described above with reference to FIG. 2b. The backplane and card-edge parts 300, 600 are brought together so that the alignment sleeve carrier 670 enters and latches into the socket member 320. The alignment process is as described in detail above for the alignment assembly 100 except that the alignment sleeve carrier 670 is rigid with respect to the first housing 610, but both ferrules 440 are capable of limited axial, angular and lateral movement within their respective ferrule carriers 400. Consequently, the socket member 320 moves on the second housing 310 as necessary to accept the rigidly held alignment sleeve carrier 670, and the alignment sleeve 280 moves within the' rigid alignment sleeve carrier 670 and both ferrules 440 move within their respective carriers 400 so that the alignment sleeve 280 accepts and aligns the ferrules 440.

Figure 8:
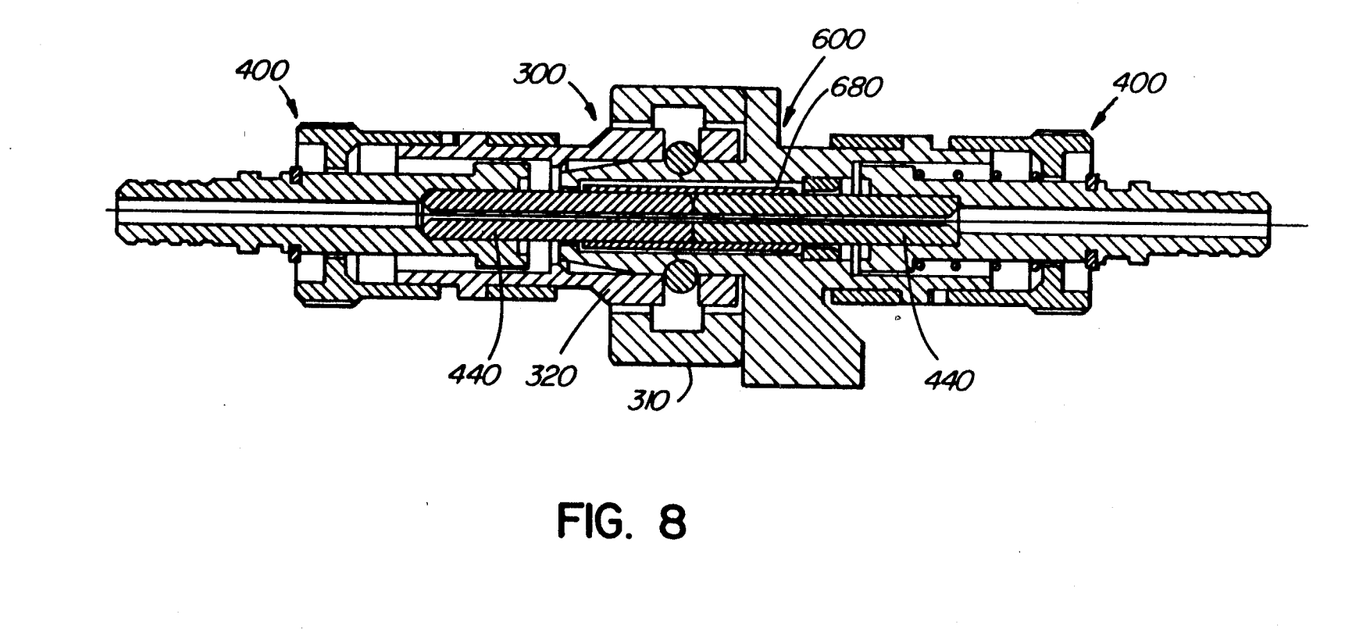
FIG. 8 is a cross-sectional view of the alignment assembly parts of FIG. 3b and FIG. 7 when fully assembled and mated.

FIG. 8 is a cross-sectional view of the backplane part 300, ferrule carriers 400 and card-edge part 600 when fully assembled to complete an optical connection.

Of course, the alignment sleeve carrier 670 could also be movably mounted to the first housing 610 to further facilitate alignment and reduce residual stresses. For example, the alignment sleeve carrier 670 could be secured to the first housing 610 by a retaining nut as in the assembly 100.

Figure 9:
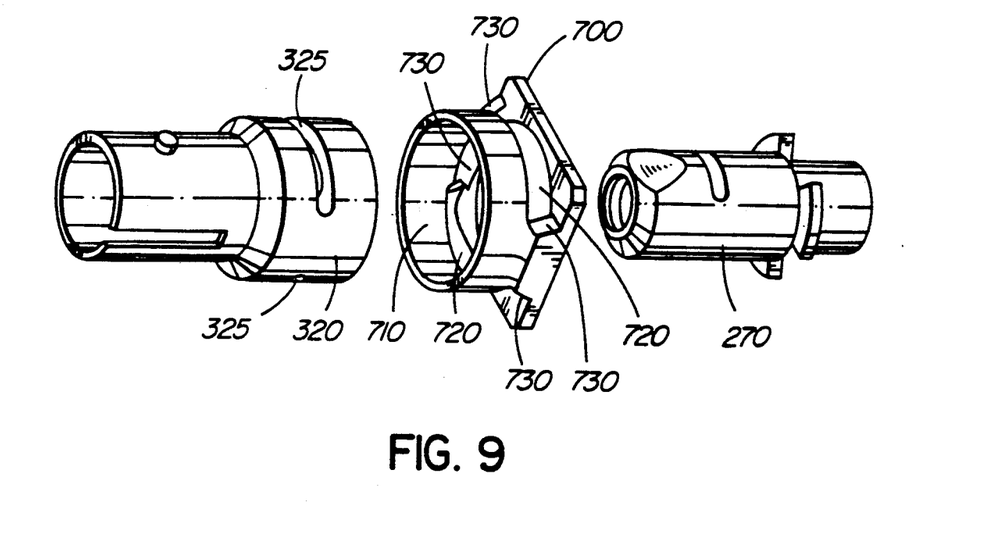
FIg. 9 is a perspective view of an insert for installation in the backplane part shown in FIG. 2b.
Figure 10:
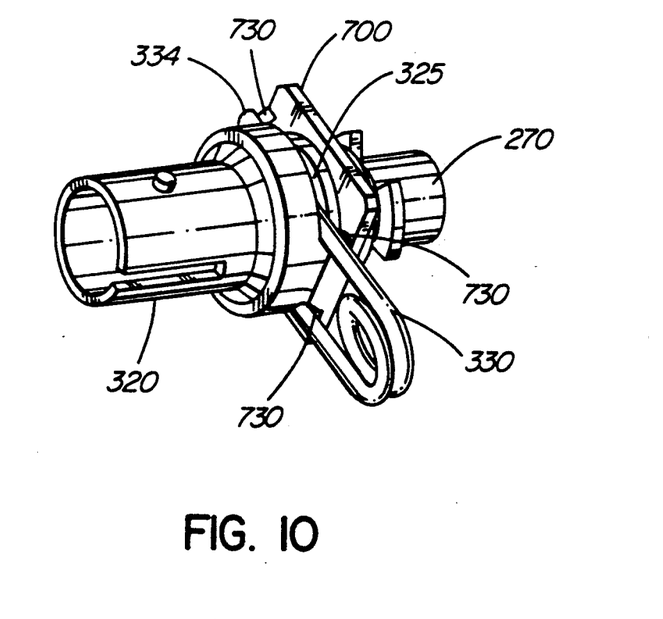
FIG. 10 is a perspective view of the insert of FIG. 9 shown assembled with an alignment sleeve carried of the card edge part of FIG. 2a and a socket member and spring clip of the backplane part of FIG. 2b.

FIG. 9 is a perspective view of an insert 700 which can be supplied as part of the second housing 310 of the backplane part 300 to facilitate unmating of the card-edge part 200, 600 from the backplane part 300. The insert 700 is installed in the cavity 312 of the second housing 310, and has a passage 710 which is within the passage 318 of the second housing 310. The passage 710 is sized to receive the socket member 320 and the alignment sleeve carrier 270, 670. The insert 700 has laterally extending through slots 720 which align with the slots 325 of the socket member 320 when the socket member 320 is in the passage 710, so that the legs 334 of the spring clip 330 pass through the slots 325, 720 of both the insert 700 and the socket member 320. The insert is free to move axially within the passage 318 of the second housing 310 together with the socket member 320, but its forward movement is limited by the forward wall 314 of the cavity 312, and its rearward movement is limited by the spring clip 330 when the spring clip engages the rear wall 315 of the cavity 312.

The insert 700 has four ramp formations 730 which engaqe the legs 334 of the spring clip 330 when the card-edge part 200, 600 is pulled away trom the haokplane part 300 to unmate the parts 200, 300, 600. The ramp formations 730 spread the legs 334 of the spring clip 330 to disengage the legs 334 from the grooves 275, 675 of the alignment sleeve carrier 270, 670, thereby facilitating unmating of the parts 200, 300, 600. (See FIG. 9 which shows the alignment sleeve carrier 270, the socket member 320, the spring clip 330 and the insert assembled together.)

These and other variations are within the scope of the invention as claimed below.

We claim:

1. An assembly for axially aligning two ferrules, the assembly comprising:
   a first housing having a passage;
   a first ferrule ridigly mounted within the passage of the first housing;

an alignment sleeve carrier having a passage extending therethrough;

an alignment sleeve retained with the passage of the alignment sleeve carrier;

first securing means for securing the alignment sleeve carrier to the first housing with the passage of the alignment sleeve carrier aligned with the passage of the first housing and with a leading end of the first ferrule extending into the alignment sleeeve retained in the passage of the alignment sleeve carrier, the first securing means permitting limited movement of the alignment sleeve carrier relative to the first housing;

a second housing;

a socket member having a passage extending therethrough for receiving a second ferrule at one end of the passage of the socket member and a leading end of the alignment sleeve carrier at another end of the passage of the socket member such that a leading end of the second ferrule can extend into the alignment seeve for axial alognment with said first ferrule when the alignment sleeve carrier is received in the passage of the socket member;

second securing means for securing the socket member to the second housing, the second securing means permitting limited movement of the socket member on the second housing;

the limited movement of the alignment sleeve carrier relative to the first housing and the socket member relative to the second housing faciliating entry of the alignment sleeve carrier into the passage of the socket member and alignment of the first and second ferrules within the alignment sleeve.

2. An assembly as defined in claim 1, wherein:

the first securing means permits limited lateral, axial and angular movement of the alignment sleeve carrier relative to the first housing; and the second securing means permits limited lateral, axial and angular movement of the socket member relative to the second housing.

3. An assembly as defined in claim 1, wherein:

the second housing has a pair of axially spaced walls; and the second securing means comprises a member which engages the socket member and is captured but movable between the axially spaced walls.

4. An assembly as defined in claim 1, wherein:

the alignment sleeve carrier has a trailing end which fits loosely into the passage of the first housing and an external shoulder adjacent the trailing end; and the first securing means comprises a nut and a complementary fitting carried by the first housing, the nut fitting over the alignment sleeve carrier to engage the shoulder of the alignment sleeve carrier and mating with the fitting on the first housing to secure the alignment sleeve carrier to the first housing, the nut and fitting permitting movement of the shoulder between the nut and the first housing when the nut is fully secured to the fitting.

5. An assembly as defined in claim 1, wherein:

the first ferrule has a passage extending axially therethrough; and the assembly further comprises:

an optoelectronic device mounted to the first housing; and an optical fiber having one end secured within the passage of the first ferrule and another end optically coupled to the opto-electronic device.

6. An assembly as defined in claim 5, wherein the first housing comprises:

a mounting block having a recess in an end surface of the mounting block, the recess being terminated in a device mounting surface, and the optoelectronic device being mounted to the device mounting surface;

an alignment tube having an end surface which engages the end surface of the mounting block; and a ferrule retainer received in the alignment tube, the first ferrule being rigidly mounted within a passage of the ferrule retainer, the alignment tube being positioned on the end surface of the mounting block and the ferrule retainer being positioned in the alignment tube in positions which substantially optimize optical coupling between the optoelectronic device and the optical fiber.

7. An assembly for axially aligning two ferrules, the assembly comprising:

a first housing having a passage for receiving a first ferrule;

an alignment sleeve carrier having a passage extending therethrough, the alignment sleeve carrier having a leading end, ramp surfaces adjacent to the leading end, and laterally extending grooves adjacent to the ramp surfaces;

an alignment sleeve retained within the passage of the alignment sleeve carrier;

first securing means for securing the alignment sleeve carrier to the first housing with the passage of the alignment sleeve carrier aligned with the passage of the first housing such that a leading end of a first ferrule received in the passage of the first housing can extend into the alignment sleeve retained in the passage of the alignment sleeve carrier;

a second housing;

a socket meber having a passage extending therehthrough for receiving a second ferrule at one end of the passge of the socket member and the leading end of the alignment sleeve carrier at another e3nd of the passge of the socket member such that a leading end of the second ferrule can extend into the alignment sleeve for axial alignment with the first ferrule received in the passage of the first housing when the alingment sleeve carrier is received in the passge of the socket member, the socket member having a pair of laterally extending slots on opposite sides of the socket member which extend through the sides of the socket member to the passage of the socket member;

second securing means for securing the socket means to the second housing, the second securing means comprising spring means having a pair of spring elements which fit into the slots of the socket member to capture the socket member and protrude laterally into the passage of the socket member from the slots, the spring means permitting lmited movement of the socket member relative to the second housing;

insertion of the alignment sleeve carrier into the socket member causing the spring elements to ride up over the ramp surfaces of the alingment sleeve carrier and rop into the grooves of the alingment sleeve carrier, thereby latching the alignment sleeve carrier into the socket member; and the limited movement of the socket member relative to the second housing facilitating entry of the alignment sleeve carrier into the passage of the socket member and alingment of the first and second ferrules within the alignment sleeve.

8. An assembly as defined in claim 7, wherein:

the spring means is mounted for limited axial movement relative to the second housing between a forward limit and a rearward limit; and insertion of the alignment sleeve carrier into the socket member forces the spring means to its rearward limit of axial movement on the second housing while the spring elements ride up over the ramp surfaces of the alignment sleeve carrier, but permits the spring means to move forward of the rearward limit when the spring elements drop into the grooves of the alignment sleeve carrier.

9. An assembly as defined in claim 8, wherein:

the second housing has two axially spaced walls;

the spring means comprises a spring member having a coiled central portion and ends protruding from the coiled portion to define the spring elements, the spring member being located between the axially spaced walls of the second housing; and the second housing comprises a retaining member extending in an axial direction from at least one of the axially spaced walls, the retaining member passing through the coiled portion to capture the spring member between the axially spaced walls.

10. An assembly as defined in claim 9, wherein the second housing comprises ramp formations extending rearward of a forwardmost of the axially spaced walls for engaging and spreading the spring elements as the spring is drawn toward the forwardmost wall to facilitate disengagement of the spring elements from the grooves of the alignment sleeve carrier.

11. An assembly as defined in claim 7, wherein the alignment sleeve carrier is rotationally keyed to the first housing to prevent rotation of the alignment sleeve carrier when it is secured to the first housing.

12. An assembly as defined in claim 7, wherein:

the passage of the first housing extends through the first housing; and the first housing comprises a fitting for securing a first ferrule carrier to the first housing with a first ferrule carried by the first ferrule carrier extending into the passage of the first housing.

13. An assembly as defined in claim 7, wherein:

the second housing has a passage extending through the second housing;

the socket member extends through the passage of the second housing and comprises a fitting for securing a second ferrule carrier to the socket member with a second ferrule carried by the second ferrule carrier extending into the passage of the socket memher; and the second securing means permits limited movement of the socket member within the passage of the second housing.

14. An assembly as defined in claim 7, further comprising:

a first ferrule rigidly mounted within the passage of the first housing, the first ferrule having a passage extending axially therethrough;

an optoelectronic device mounted to the first housing; and an optical fiber having one end secured within the passage of the first ferrule and another end optically coupled to the optoelectronic device;

and wherein the first securing means permits limited movement of the alignment sleeve carrier on the first housing.

15. An assembly as defined in claim 7, wherein:

the alignment sleeve comprises a split sleeve which is resiliently radially expandable to receive and axially align first and second ferrules;

the passage of the alignment sleeve carrier has lateral dimensions which permit radial expansion of the alignment sleeve within the passage; and the alignment sleeve carrier has shoulders which project into the passage at ends of the passage to retain the alignment sleeve in the passage.

16. An assembly as defined in claim 7, wherein the first and second housings comprise complementary guide formations for guiding the housings together so that the alignment sleeve carrier enters the socket member.

17. An assembly as defined in claim 7, wherein at least one of the alignment sleeve carrier and the socket member is champfered to facilitate insertion of the alignment sleeve carrier into the socket member.

18. An assembly as defined in claim 7, wherein the first and second housings carry complementary electrical connector means for mating to complete an electrical connection when the alignment sleeve carrier is inserted into the socket member.

19. An assembly as defined in claim 7, comprising a plurality of alignment sleeve carriers secured to the first housing member, each alignment sleeve carrier carrying an alignment sleeve, and a plurality of socket members secured to the second housing for alignment of a plurality of pairs of first and second ferrules in a single mating operation.

20. An assembly as defined in claim 7, wherein one of the first and second housings comprises a latch release operable to unlatch the alignment sleeve carrier from the socket member.

* * * * *